United States Patent
Hwang et al.

(10) Patent No.: US 7,333,551 B2
(45) Date of Patent: Feb. 19, 2008

(54) APPARATUS AND METHOD FOR TRANSMITTING AND RECEIVING DATA IN A MOBILE COMMUNICATION SYSTEM USING SPACE-TIME TRELLIS CODE

(75) Inventors: Chan-Soo Hwang, Yongin-shi (KR); Yung-Soo Kim, Songnam-shi (KR); Seung-Hoon Nam, Seoul (KR); Jae-Hak Chung, Seoul (KR)

(73) Assignee: Samsung Electronics Co., Ltd. (KR)

( * ) Notice: Subject to any disclaimer, the term of this patent is extended or adjusted under 35 U.S.C. 154(b) by 765 days.

(21) Appl. No.: 10/694,197

(22) Filed: Oct. 27, 2003

(65) Prior Publication Data
US 2004/0151256 A1 Aug. 5, 2004

(30) Foreign Application Priority Data
Jan. 21, 2003 (KR) .................. 10-2003-0004089

(51) Int. Cl.
H04L 23/02 (2006.01)
(52) U.S. Cl. ...................................... 375/265
(58) Field of Classification Search ............... 375/265, 375/267, 340, 347, 304, 299; 455/272; 714/746, 714/754
See application file for complete search history.

(56) References Cited

U.S. PATENT DOCUMENTS

| 6,678,263 B1* | 1/2004 | Hammons et al. ......... 370/342 |
| 2003/0088822 A1* | 5/2003 | Kim et al. .................. 714/790 |

FOREIGN PATENT DOCUMENTS

WO WO 02/07373 1/2002
WO WO 02/43314 5/2002

OTHER PUBLICATIONS

Vahid Tarokh et al., "Space-Time Codes for High Data Rate Wireless Communication: Performance Criterion and Code Construction", IEEE Transactions on Information Theory, vol. 44, No. 2, Mar. 1998, pp. 744-765.
European Search Report dated Mar. 9, 2004 issued in a counterpart application, namely, Appln. No. 03078915.0.
Tujkovic, "High Bandwidth Efficiency Space-Time Turbo Coded Modulation", 2001 IEEE, pp. 1104-1109.
Robertson, "Bandwidth-Efficient Turbo Trellis-Coded Modulation Using Punctured Component Codes", IEEE Journal on Selected Areas in Communications, vol. 16, No. 2, Feb. 1998, pp. 206-218.
Yuan et al., "Soft Concatenation of Space-Time Block Codes and Multilevel Coding", 2001 IEEE, pp. 1165-1169.
T.H. Liew et al., "Space-Time Codes and Concatenated Channel Codes for Wireless Communications", Proceedings of the IEEE, Feb. 2002, vol. 90, No. 2, pp. 187-219.

* cited by examiner

*Primary Examiner*—Khai Tran
(74) *Attorney, Agent, or Firm*—The Farrell Law Firm, PC

(57) ABSTRACT

A mobile communication system having M transmission antennas for receiving P information bit streams and encoding the received information bit streams with a space-time trellis code (STTC) according to an optimal generator polynomial; modulating the encoded P information bit streams in a predetermined modulation scheme and outputting modulation symbol streams; and puncturing at least one modulation symbol in a predetermined position from each of the M modulation symbol streams, and transmitting the punctured modulation symbol streams through the M transmission antennas, thereby increasing a data rate while maintaining maximum diversity gain.

37 Claims, 8 Drawing Sheets

APPARATUS AND METHOD FOR TRANSMITTING AND RECEIVING DATA IN A MOBILE COMMUNICATION SYSTEM USING SPACE-TIME TRELLIS CODE

PRIORITY

This application claims priority under 35 U.S.C. § 119 to an application entitled "Apparatus and Method for Transmitting and Receiving Data in a Mobile Communication System Using Space-Time Trellis Code" filed in the Korean Intellectual Property Office on Jan. 21, 2003 and assigned Ser. No. 2003-4089, the contents of which are incorporated herein by reference.

BACKGROUND OF THE INVENTION

1. Field of the Invention

The present invention relates generally to a mobile communication system, and in particular, to an apparatus and method for transmitting and receiving data in a mobile communication system using a space-time trellis code (STTC).

2. Description of the Related Art

With the rapid development of mobile communication systems, the amount of data serviced by the mobile communication system has also increased. Recently, a $3^{rd}$ generation mobile communication system for transmitting high-speed data has been developed. For the $3^{rd}$ generation mobile communication system, Europe has adopted an asynchronous wideband-code division multiple access (W-CDMA) system as its radio access standard, while North America has adopted a synchronous code division multiple access-2000 (CDMA-2000) system as its radio access standard. Generally, in these mobile communication systems, a plurality of mobile stations (MSs) communicate with each other via a common base station (BS). However, during high-speed data transmission in the mobile communication system, a phase of a received signal may be distorted due to a fading phenomenon occurring on a radio channel. The fading reduces amplitude of a received signal by several dB to several tens of dB. If a phase of a received signal distorted due to the fading phenomenon is not compensated for during data demodulation, the phase distortion becomes a cause of information errors of transmission data transmitted by a transmission side, causing a reduction in the quality of a mobile communication service. Therefore, in mobile communication systems, fading must be overcome in order to transmit high-speed data without a decrease in the service quality, and several diversity techniques are used in order to cope with the fading.

Generally, a CDMA system adopts a rake receiver that performs diversity reception by using delay spread of a channel. While the rake receiver applies reception diversity for receiving a multipath signal, a rake receiver applying the diversity technique using the delay spread is disadvantageous in that it does not operate when the delay spread is less than a preset value. In addition, a time diversity technique using interleaving and coding is used in a Doppler spread channel. However, the time diversity technique is disadvantageous in that it can hardly be used in a low-speed Doppler spread channel.

Therefore, in order to cope with fading, a space diversity technique is used in a channel with low delay spread, such as an indoor channel, and a channel with low-speed Doppler spread, such as a pedestrian channel. The space diversity technique uses two or more transmission/reception antennas.

In this technique, when a signal transmitted via one transmission antenna decreases in its signal power due to fading, a signal transmitted via the other transmission antenna is received. The space diversity can be classified into a reception antenna diversity technique using a reception antenna and a transmission diversity technique using a transmission antenna. However, since the reception antenna diversity technique is applied to a mobile station, it is difficult to install a plurality of antennas in the mobile station in view of the mobile station's size and its installation cost. Therefore, it is recommended that the transmission diversity technique should be used in which a plurality of transmission antennas are installed in a base station.

Particularly, in a $4^{th}$ generation mobile communication system, a data rate of about 10 Mbps to 150 Mbps is expected, and an error rate requires a bit error rate (BER) of $10^{-3}$ for voice, BER of $10^{-6}$ for data, and BER of $10^{-9}$ for image. The STTC is a combination of a multi-antenna technique and a channel coding technique, and is a technique bringing a drastic improvement of a data rate and reliability in a radio MIMO (Multi Input Multi Output) channel. The STTC obtains the receiver's space-time diversity gain by extending the space-time dimension of a transmitter's transmission signal. In addition, the STTC can obtain coding gain without a supplemental bandwidth, contributing to an improvement in channel capacity.

Therefore, in the transmission diversity technique, the STTC is used. When the STTC is used, coding gain having an effect of increasing transmission power is obtained together with diversity gain which is equivalent to a reduction in channel gain occurring due to a fading channel when the multiple transmission antennas are used. A method for transmitting a signal using the STTC is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, the contents of which are incorporated herein by reference. In this reference, it is provided that if a code rate is defined as the number of symbols transmitted for a unit transmission time, the code rate must be smaller than 1 in order to obtain diversity gain equivalent to the product of the number of transmission antennas and the number of reception antennas.

FIG. 1 is a block diagram schematically illustrating a general structure of a transmitter using STTC. Referring to FIG. 1, if P information data bits $d_1, d_2, d_3, \ldots, d_P$ are input to the transmitter, the input information data bits $d_1, d_2, d_3, \ldots, d_P$ are provided to a serial-to-parallel (S/P) converter 111. Here, the index P represents the number of information data bits to be transmitted by the transmitter for a unit transmission time, and the unit transmission time can become a symbol unit. The S/P converter 111 parallel-converts the information data bits $d_1, d_2, d_3, \ldots, d_P$ and provides its outputs to first to $P^{th}$ encoders 121-1 to 121-P. That is, the S/P converter 111 provides a parallel-converted information data bit $d_1$ to the first encoder 121-1, and in this manner, provides a parallel-converted information data bit $d_p$ to the $P^{th}$ encoder 121-P. The first to $P^{th}$ encoders 121-1 to 121-P each encode signals output from the S/P converter 111 in a predetermined encoding scheme, and then each provide their outputs to first to $M^{th}$ modulators 131-1 to 131-M. Here, the index M represents the number of transmission antennas included in the transmitter, and the predetermined encoding scheme is an STTC encoding scheme. A detailed structure of the first to $P^{th}$ encoders 121-1 to 121-P will be described later with reference to FIG. 2.

The first to $M^{th}$ modulators 131-1 to 131-M each modulate signals received from the first to $P^{th}$ encoders 121-1 to 121-P in a predetermined modulation scheme. The first to $M^{th}$ modulators 131-1 to 131-M are similar to one another in operation except the signals applied thereto. Therefore, only the first modulator 131-1 will be described herein. The first modulator 131-1 adds up signals received from the first to $P^{th}$ encoders 121-1 to 121-P, multiplies the addition result by a gain applied to a transmission antenna to which the first modulator 131-1 is connected, i.e., a first transmission antenna ANT#1, modulates the multiplication result in a predetermined modulation scheme, and provides the modulation result to the first transmission antenna ANT#1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). It will be assumed in FIG. 1 that since the number of encoders is P, $2^P$-ary QAM is used as a modulation scheme. The first to $M^{th}$ modulators 131-1 to 131-M provide their modulation symbols $S_1$ to $S_M$ to first to $M^{th}$ transmission antennas ANT#1 to ANT#M, respectively. The first to $M^{th}$ transmission antennas ANT#1 to ANT#M transmit to the air the modulation symbols $S_1$ to $S_M$ output from the first to $M^{th}$ modulators 131-1 to 131-M.

FIG. 2 is a block diagram illustrating a detailed structure of the first to $P^{th}$ encoders 121-1 to 121-P of FIG. 1. For simplicity, a description will be made of only the first encoder 121-1. The information data bit $d_1$ output from the S/P converter 111 is applied to the first encoder 121-1, and the first encoder 121-1 provides the information data bit $d_1$ to tapped delay lines, i.e., delays (D) 211-1, 211-2, ..., 211-(K−1). Here, the number of the delays, or the tapped delay lines, is smaller by 1 than a constraint length K of the first encoder 121-1. The delays 211-1, 211-2, ..., 211-(K−1) each delay their input signals. That is, the delay 211-1 delays the information data bit $d_1$ and provides its output to the delay 211-2, and the delay 211-2 delays an output signal of the delay 211-1. In addition, input signals provided to the delays 211-1, 211-2, ..., 211-(K−1) are multiplied by predetermined gains, and then provided to modulo adders 221-1, ..., 221-M, respectively. The number of the modulo adders is identical to the number of the transmission antennas. In FIG. 1, since the number of the transmission antennas is M, the number of the modulo adders is also M. Further, gains multiplied by the input signals of the delays 211-1, 211-2, ..., 211-(K−1) are represented by $g_{i,j,t}$, where i denotes an encoder index, j an antenna index and t a memory index. In FIG. 1, since the number of encoders is P and the number of antennas is M, the encoder index i increases from 1 to P, the antenna index j increases from 1 to M, and the memory index K increases from 1 to the constraint length K. The modulo adders 221-1, ..., 221-M each modulo-add signals obtained by multiplying the input signals of the corresponding delays 211-1, 211-2, ..., 211-(K−1) by the gains. The STTC encoding scheme is also disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998.

FIG. 3 is a block diagram schematically illustrating a structure of an STTC transmitter having two encoders and three transmission antennas. Referring to FIG. 3, if 2 information data bits $d_1$ and $d_2$ are input to the transmitter, the input information data bits $d_1$ and $d_2$ are applied to an S/P converter 311. The S/P converter 311 parallel-converts the information data bits $d_1$ and $d_2$, and outputs the information data bit $d_1$ to a first encoder 321-1 and the information data bit $d_2$ to a second encoder 321-2. If it is assumed that the first encoder 321-1 has a constraint length K of 4 (constraint length K=4), an internal structure, illustrated in FIG. 2, of the first encoder 321-1 is comprised of 3 delays ($1+2D+D^3$) and 3 modulo adders, wherein the number of delays and modulo adders is equal to a value smaller by 1 than the constraint length K=4. Therefore, in the first encoder 321-1, the undelayed information data bit $d_1$ applied to a first delay, a bit determined by multiplying a bit delayed once by the first delay by 2, and a bit delayed three times by a third delay are provided to a first modulo adder connected to a first modulator 331-1 of a first transmission antenna ANT#1. In this manner, outputs of the 3 modulo adders of the first encoder 321-1 are provided to the first modulator 331-1, a second modulator 331-2 and a third modulator 331-3, respectively. Similarly, the second encoder 321-2 encodes the information data bit $d_2$ output from the S/P converter 311 in the same encoding scheme as that used by the first encoder 321-1, and then, provides its outputs to he first modulator 331-1, the second modulator 331-2 and the third modulator 331-3.

The first modulator 331-1 modulates the signals output from the first encoder 321-1 and the second encoder 321-2 in a predetermined modulation scheme, and then provides its output to a first transmission antenna ANT#1. It is assumed herein that a modulation scheme applied to the transmitter is QPSK. Therefore, if an output signal of the first encoder 321-1 is $b_1$ and an output signal of the second encoder 321-2 is $b_2$, the first modulator 331-1 modulates the output signals in the QPSK modulation scheme, and outputs $b_1+b_2*j$, where $j=\sqrt{-1}$. Like the first modulator 331-1, the second modulator 331-2 and the third modulator 331-3 modulate output signals of the first encoder 321-1 and the second encoder 321-2 in the QPSK modulation scheme, and then provide their outputs to a second transmission antenna ANT#2 and a third transmission antenna ANT#3, respectively. The first to third transmission antennas ANT#1 to ANT#3 transmit to the air the modulation symbols $S_1$ to $S_3$ output from the first to third modulators 331-1 to 331-3, respectively.

FIG. 4 is a block diagram schematically illustrating a receiver structure corresponding to the transmitter structure of FIG. 1. Referring to FIG. 4, a signal transmitted to the air by a transmitter is received through reception antennas of the receiver. It is assumed in FIG. 4 that there are provided N reception antennas. The N reception antennas each process signals received from the air. Signals received through first to $N^{th}$ reception antennas ANT#1 to ANT#N are provided to a channel estimator 411 and a metric calculator 423. The channel estimator 411 performs channel estimation on signals output from the first to $N^{th}$ reception antennas ANT#1 to ANT#N, and then provides the channel estimation result to a hypothesis part 412.

A possible sequence generator 415 generates all kinds of sequences, which were possibly simultaneously encoded for information data bits in the transmitter, and provides the generated sequences to first to $P^{th}$ encoders 417-1 to 417-P. Since the transmitter transmits information data by the P information bits, the possible sequence generator 415 generates possible sequences $\tilde{d}_1 \ldots \tilde{d}_P$ comprised of P bits. The P bits of the generated possible sequences are applied to the first to $P^{th}$ encoders 417-1 to 417-P, and the first to $P^{th}$ encoders 417-1 to 417-P encode their input bits in the STTC encoding scheme described in conjunction with FIG. 2, and then provide the encoded bits to first to $M^{th}$ modulators 419-1 to 419-M. The first to $M^{th}$ modulators 419-1 to 419-M each modulate the encoded bits output from the first to $P^{th}$ encoders 417-1 to 417-P in a predetermined modulation scheme, and provide their outputs to the hypothesis part 412. The modulation scheme applied in the first to $M^{th}$ modulators 419-1 to 419-M is set to any one of the BPSK, QPSK, QAM, PAM and PSK modulation schemes. Since a modulation scheme applied in the first to $M^{th}$ modulators 131-1 to 131-M of FIG. 1 is $2^P$-ary QAM, the first to $M^{th}$ modulators 419-1 to 419-M also modulate their input signals in the $2^P$-ary QAM modulation scheme.

The hypothesis part 412 receives signals output from the first to $M^{th}$ modulators 419-1 to 419-M and the channel estimation result output from the channel estimator 411, generates a hypothetic channel output at a time when a sequence consisting of the signals output from the first to $M^{th}$ modulators 419-1 to 419-M has passed the same channel as the channel estimation result did, and provides the generated hypothetic channel output to the metric calculator 423. The metric calculator 423 receives the hypothetic channel output provided from the hypothesis part 412 and the signals received through the first to $N^{th}$ reception antennas ANT#1 to ANT#N, and calculates a distance between the hypothetic channel output and the signals received through the first to $N^{th}$ reception antennas ANT#1 to ANT#N. The metric calculator 423 uses Euclidean distance when calculating the distance.

In this manner, the metric calculator 423 calculates Euclidean distance for all possible sequences the transmitter can transmit, and then provides the calculated Euclidean distance to a minimum distance selector 425. The minimum distance selector 425 selects a Euclidean distance having the minimum distance from Euclidean distances output from the metric calculator 423, determines information bits corresponding to the selected Euclidean distance as information bits transmitted by the transmitter, and provides the determined information bits to a parallel-to-serial (P/S) converter 427. Although there are several possible algorithms used when the minimum distance selector 425 determines information bits corresponding to the Euclidean distance having the minimum distance, it is assumed herein that a Viterbi algorithm is used. A process of extracting information bits having the minimum distance by using the Viterbi algorithm is also disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, so a detailed description thereof will not be provided for simplicity. Since the minimum distance selector 425 determines information bits corresponding to the Euclidean distance having the minimum distance for all sequences generated from the possible sequence generator 415, it finally outputs P information bits of $d_1, d_1, \ldots, d_P$. The P/S converter 427 then serial-converts the P information bits output from the minimum distance selector 425, and outputs a reception information data sequence of $d_1, d_1, \ldots, d_P$.

As described above, when the transmitter transmits a signal with a plurality of transmission antennas, the STTC can achieve coding gain having an effect of amplifying power of a received transmission signal, together with diversity gain, in order to prevent a reduction in channel gain occurring due to a fading channel. In the Tarokh reference, it is provided that if a code rate is defined as the number of symbols transmitted for a unit time in a communication system using STTC, the code rate must be smaller than 1 in order to obtain diversity gain corresponding to the product of the number of transmission antennas and the number of reception antennas. That is, it is provided that if it is assumed that the number of information data bits in a symbol transmitted to the air through one transmission antenna at a particular transmission time is N, even though a transmitter uses a plurality of transmission antennas, the number of information data bits that can be transmitted to the air through the plural transmission antennas at a particular transmission time must be smaller than or equal to N. The reason for providing that the number of information data bits that can be transmitted to the air through a plurality of transmission antennas should be smaller than or equal to N is to maintain diversity gain through the plural transmission antennas. Therefore, a communication system using the STTC has a difficulty in increasing its spectrum efficiency.

In addition, the communication system using the STTC has difficulty adjusting the code rate, because the code rate can be adjusted only by increasing a constellation size of modulation signals, or modulation symbols, transmitted through transmission antennas. Here, increasing a constellation size of the modulation symbols is equivalent to increasing the number of information data bits existing in each of the modulation symbols. Since it is difficult to adjust the code rate, it is impossible to adjust a code rate to a superior performance like 2.5 bits/channel use.

Finally, the communication system using the STTC has a limitation in retransmission when an error occurs in a receiver side. That is, a recently proposed wireless communication system, for example, a high-speed downlink packet access (HSDPA) communication system, provides an automatic repeat request (hereinafter referred to as "ARQ") scheme in which when a receiver fails to normally receive a signal transmitted from a transmitter, retransmission is performed. As the ARQ scheme, an incremental redundancy (IR) scheme is typically used in which a part of the transmission-failed signal, not all of the transmission-failed signal, is retransmitted. However, the communication system using the STTC cannot use the IR scheme as the ARQ scheme because a separate puncturing scheme for a transmission signal has not been developed.

SUMMARY OF THE INVENTION

It is, therefore, an object of the present invention to provide a data transmission/reception apparatus and method for maximizing a data rate in a mobile communication system using STTC.

It is another object of the present invention to provide a data puncturing apparatus and method in a mobile communication system using STTC.

It is further another object of the present invention to provide a data transmission/reception apparatus and method for maintaining maximum diversity gain in a mobile communication system using STTC.

It is yet another object of the present invention to provide a trellis termination apparatus and method for maintaining maximum diversity gain in a mobile communication system using STTC.

To achieve the above and other objects, the invention provides a data transmission apparatus having maximum diversity gain in a mobile communication system having M transmission antennas. The apparatus comprises P encoders for receiving P information bit streams and encoding the received information bit streams with a space-time trellis code (STTC) according to an optimal generator polynomial; M modulators for modulating information bit streams output from the P encoders in a predetermined modulation scheme and outputting modulation symbol streams; and M puncturers connected to the M transmission antennas, for puncturing at least one modulation symbol in a predetermined position from each of the modulation symbol streams output form the M modulators, and transmitting the punctured modulation symbol streams through the M transmission antennas.

To achieve the above and other objects, the invention also provides a data reception apparatus having maximum diversity gain in a mobile communication system which receives through M reception antennas transmission symbol streams transmitted through N transmission antennas from a transmitter. The apparatus comprises a channel estimator connected to the M reception antennas, for channel-estimating reception symbol streams output from the M reception antennas; P encoders for encoding all information bit streams that the transmitter can transmit with a space-time trellis code (STTC) according to a predetermined optimal generator polynomial; M modulator for modulating information bit streams output from the P encoders in a predetermined modulation scheme and outputting modulation symbol streams; M puncturers connected to the M transmission antennas, for puncturing at least one modulation symbol in a predetermined position from each of the modulation symbol streams output from the M modulators; and a transmission symbol stream detector for detecting transmission symbol streams transmitted from the transmitter by using a hypothetic channel output for a case where the modulation symbol streams output from the M puncturers were transmitted through the same channel as a channel estimated by the channel estimator, and the reception symbol streams.

To achieve the above and other objects, the invention provides a data transmission method having maximum diversity gain in a mobile communication system having M transmission antennas. The method comprises receiving P information bit streams and encoding the received information bit streams with a space-time trellis code (STTC) according to an optimal generator polynomial; modulating the encoded P information bit streams in a predetermined modulation scheme and outputting modulation symbol streams; puncturing at least one modulation symbol in a predetermined position from each of the M modulation symbol streams; and transmitting the punctured modulation symbol streams through the M transmission antennas.

To achieve the above and other objects, the invention also provides a data reception method having maximum diversity gain in a mobile communication system which receives through M reception antennas transmission symbol streams transmitted through N transmission antennas from a transmitter. The method comprises channel-estimating reception symbol streams output from the M reception antennas; encoding all information bit streams that the transmitter can transmit with a space-time trellis code (STTC) according to a predetermined optimal generator polynomial; modulating the encoded information bit streams in a predetermined modulation scheme and outputting modulation symbol streams; puncturing at least one modulation symbol in a predetermined position from each of the modulation symbol streams; and detecting transmission symbol streams transmitted from the transmitter by using a hypothetic channel output for a case where the punctured modulation symbol streams were transmitted through the same channel as the channel-estimated channel, and the reception symbol streams.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will be described in detail herein below with reference to the annexed drawings. In the following description, a detailed description of known functions and configurations incorporated herein has been omitted for conciseness.

Figure 1:
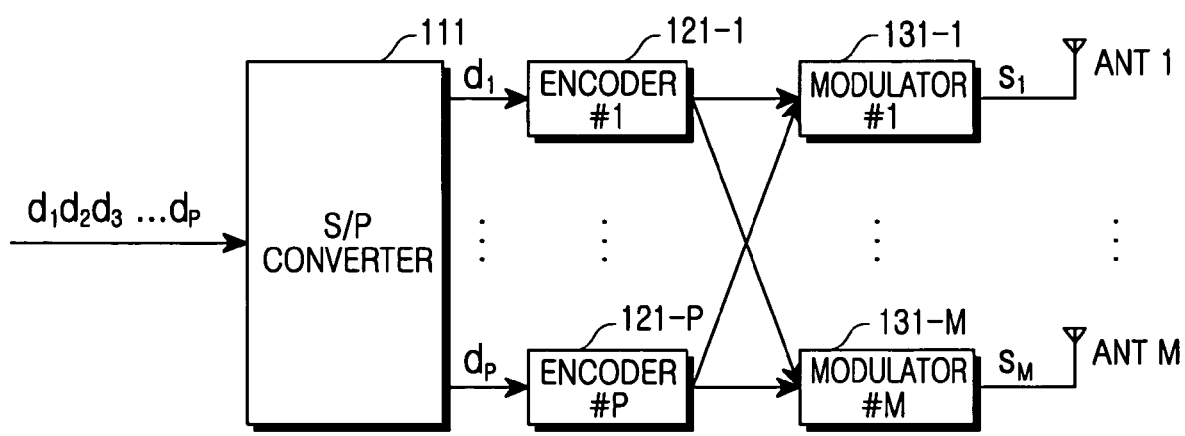
FIG. 1 is a block diagram schematically illustrating a conventional structure of a transmitter using STTC.
Figure 2:
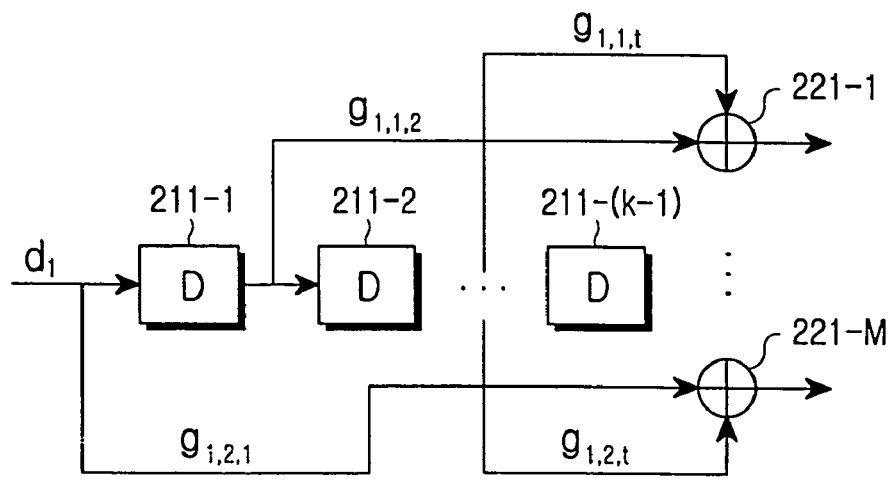
FIG. 2 is a block diagram illustrating a detailed structure of the first to $P^{th}$ encoders of FIG. 1.
Figure 3:
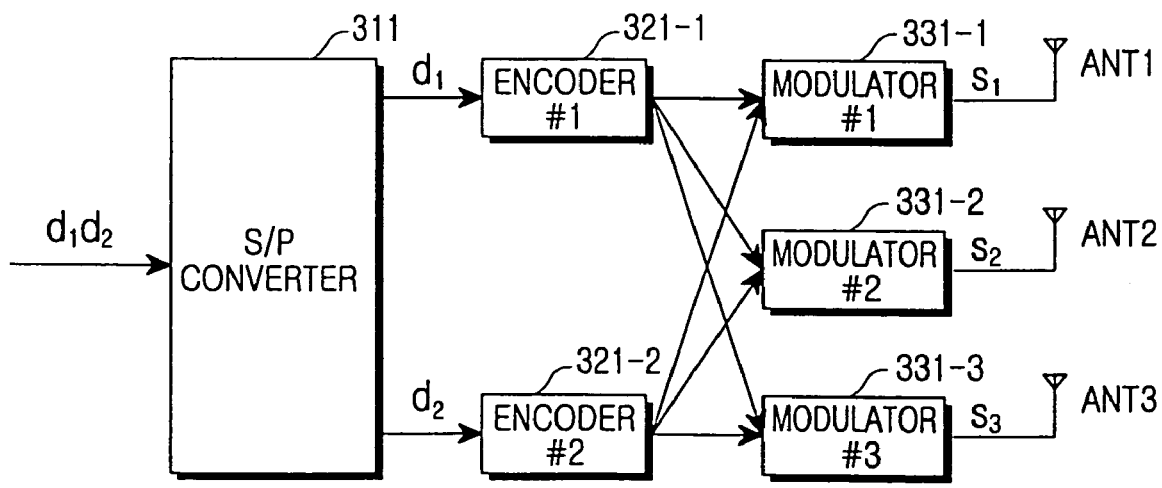
FIG. 3 is a block diagram schematically illustrating a structure of an STTC transmitter having two encoders and three transmission antennas.
Figure 4:
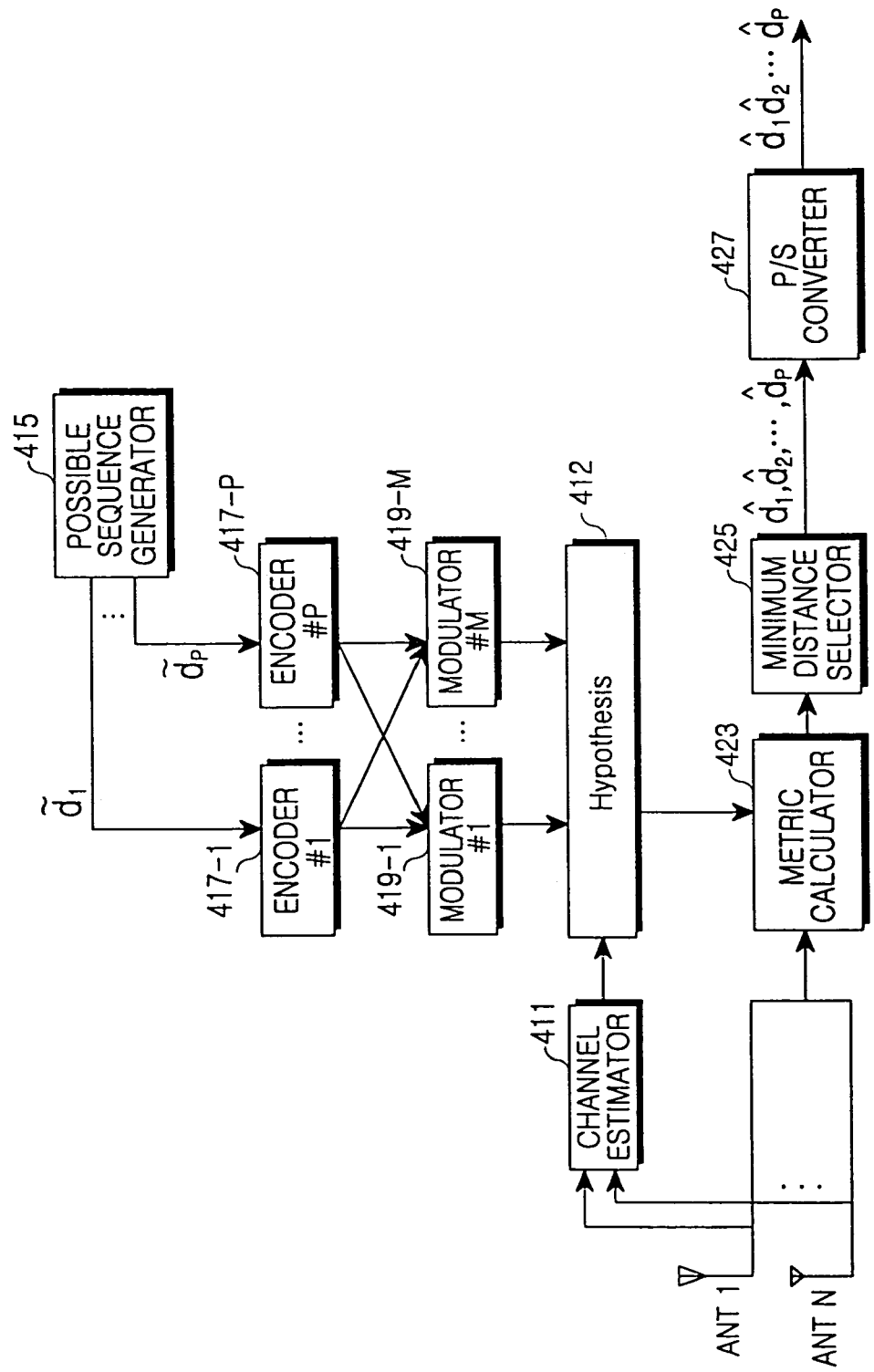
FIG. 4 is a block diagram schematically illustrating a receiver structure corresponding to the transmitter structure of FIG. 1.
Figure 5:
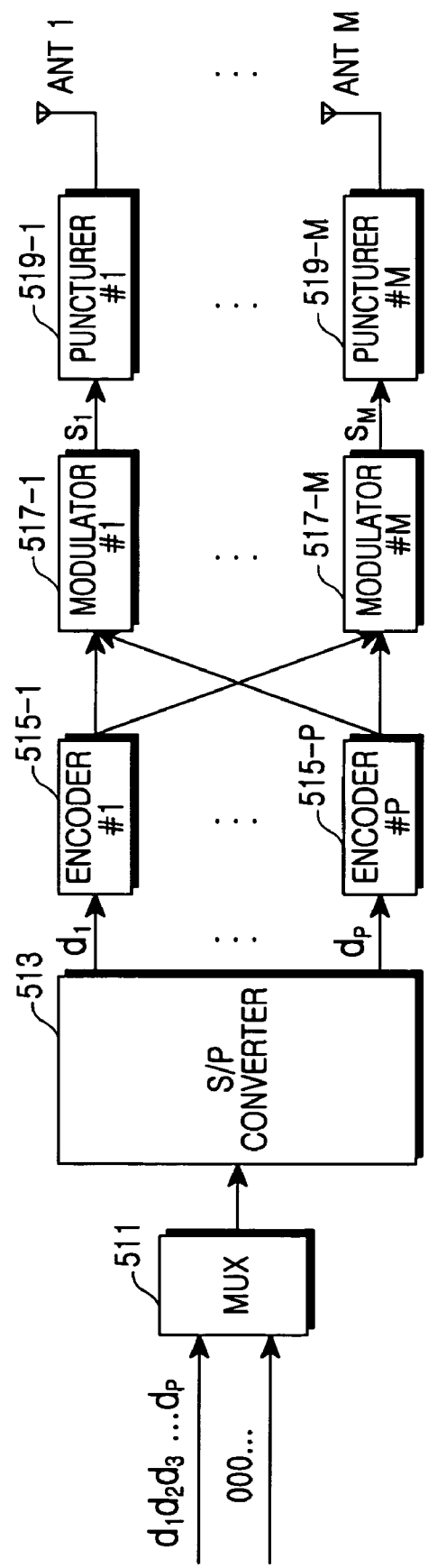
FIG. 5 is a block diagram schematically illustrating a structure of a transmitter using an STTC according to an embodiment of the present invention.

FIG. 5 is a block diagram schematically illustrating a structure of a transmitter using a space-time trellis code STTC according to an embodiment of the present invention. Referring to FIG. 5, if P information data bits $d_1$, $d_2$, $d_3$, ..., $d_P$ are input to the transmitter, the input information data bits $d_1$, $d_2$, $d_3$, ..., $d_P$ are provided to a multiplexer (MUX) 511. The multiplexer 511 multiplexes the information data bits $d_1$, $d_2$, $d_3$, ..., $d_P$ with '0000...', and provides its output to a serial-to-parallel (S/P) converter 513. The reason for multiplexing the information data bits $d_1$, $d_2$, $d_3$, ..., $d^P$ with '0000...' is to perform trellis termination. A detailed description of a trellis termination operation by the multiplexer 511 will be provided later. Here, the index P represents the number of information data bits to be transmitted by the transmitter for a unit transmission time, and the unit transmission time can become a symbol unit. The S/P converter 513 parallel-converts the information data bits $d_1$, $d_2$, $d_3$, ..., $d_P$ and provides its outputs to first to $P^{th}$ encoders 515-1 to 515-P. That is, the S/P converter 513 provides a parallel-converted information data bit $d_1$ to the first encoder 515-1, and in this manner, provides a parallel-converted information data bit $d_P$ to the $P^{th}$ encoder 515-P. The first encoder 515-1 then encodes the information data bit $d_1$ in an STTC encoding scheme and provides its output to first to $M^{th}$ modulators 517-1 to 517-M. Here, the index M represents the number of transmission antennas included in the transmitter. In this way, the $P^{th}$ encoder 515-P encodes the information data bit $d_P$ in the STTC encoding scheme, and then provides its output to the first to $M^{th}$ modulators 517-1 to 517-M. The first to $P^{th}$ encoders 515-1 to 515-P have the structure described in conjunction with FIG. 2, so a detailed description thereof will be omitted.

The first to $M^{th}$ modulators 517-1 to 517-M each modulate signals received from the first to $P^{th}$ encoders 515-1 to 515-P in a predetermined modulation scheme. The first to $M^{th}$ modulators 517-1 to 517-M are similar to each another in operation except for the signals applied thereto. Therefore, only the first modulator 517-1 will be described herein. The first modulator 517-1 adds up signals received from the first to $P^{th}$ encoders 515-1 to 515-P, multiplies the addition result by a gain applied to a transmission antenna to which the first modulator 517-1 is connected, i.e., a first transmission antenna ANT#1, modulates the multiplication result in a predetermined modulation scheme, and provides the modulation result to a first puncturer 519-1. Here, the modulation scheme includes BPSK (Binary Phase Shift Keying), QPSK (Quadrature Phase Shift Keying), QAM (Quadrature Amplitude Modulation), PAM (Pulse Amplitude Modulation), and PSK (Phase Shift Keying). It will be assumed in FIG. 5 that since the number of encoders is P, $2^P$-ary QAM is used as a modulation scheme.

The first to $M^{th}$ modulators 517-1 to 517-M provide their modulation symbols $S_1$ to $S_M$ to first to $M^{th}$ transmission puncturers 519-1 to 519-M, respectively. The first to $M^{th}$ transmission puncturers 519-1 to 519-M each puncture signals output from the first to $M^{th}$ modulators 517-1 to 517-M according to a predetermined puncturing matrix, and then transmit their outputs to the air through first to $M^{th}$ transmission antennas ANT#1 to ANT#M. A detailed description will now be made of a procedure in which the first to $M^{th}$ puncturers 519-1 to 519-M each puncture the modulation symbols $S_1$ to $S_M$, which are output from the first to $M^{th}$ modulators 517-1 to 517-M according to the puncturing matrix.

For example, if it is assumed that the number of transmission antennas included in the transmitter is 2 and 4 symbols are transmitted through the 2 transmission antennas for a unit transmission period, then a puncturing matrix given by Equation (1) below is applied.

$$P_1 = \begin{bmatrix} 1 & 1 & 1 & 0 \\ 1 & 0 & 1 & 1 \end{bmatrix} \quad \text{Equation (1)}$$

In Equation (1), $P_1$ represents a puncturing matrix. In the puncturing matrix $P_1$, a column represents a transmission period, i.e., a symbol period, and a row represents a transmission antenna. In the puncturing matrix $P_1$, an element "1" represents that an input modulation symbol is passed without being punctured, while an element "0" represents that an input modulation symbol is punctured, so that no modulation symbol is transmitted for a corresponding period. That is, in the puncturing matrix $P_1$, for a first column, or a first symbol period, a modulation symbol output from a first modulator connected to a first transmission antenna and a modulation symbol output from a second modulator connected to a second transmission antenna are passed without being punctured. However, in the puncturing matrix $P_1$, for a second column, or a second symbol period, a modulation symbol output from the first modulator connected to the first transmission antenna is passed without being punctured, while a modulation symbol output from the second modulator connected to the second transmission antenna is punctured. Therefore, a code rate for the case where the puncturing matrix $P_1$ is applied is 4/3 times higher than a code rate for the case where the puncturing matrix $P_1$ is not applied. Additional information can be transmitted through the punctured period, and the additional information includes incremental redundancy (IR) information for automatic repeat retransmission (ARQ) or separate initial transmission information. The additional information inserted in the punctured period is not limited as long as a mobile communication system using the STTC specifies transmission reception periods.

Figure 6:
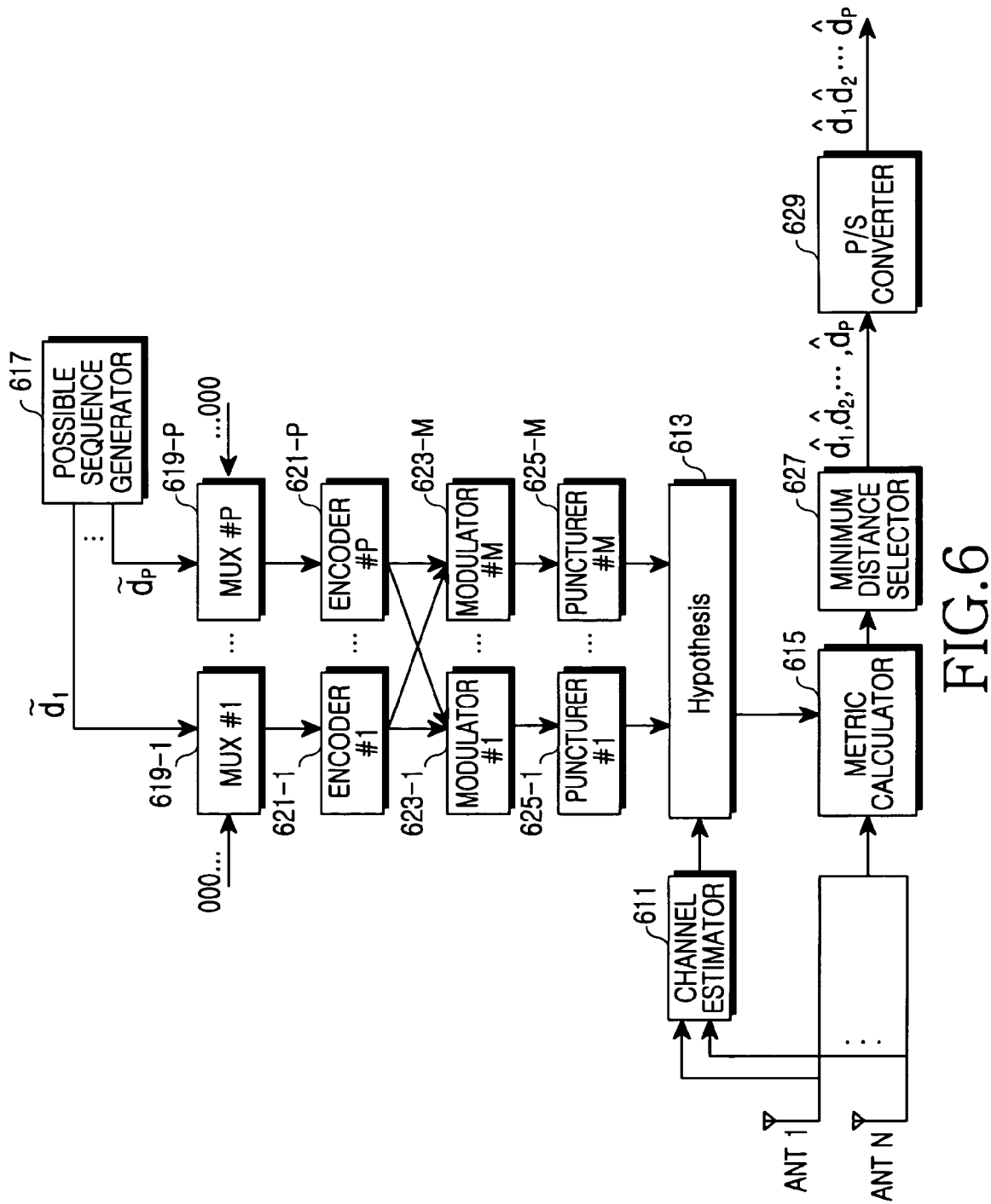
FIG. 6 is a block diagram schematically illustrating a receiver structure corresponding to the transmitter structure of FIG. 5.

FIG. 6 is a block diagram schematically illustrating a receiver structure corresponding to the transmitter structure illustrated in FIG. 5. Referring to FIG. 6, a signal transmitted to the air by a transmitter is received through reception antennas of the receiver. It is assumed in FIG. 6 that there are provided N reception antennas. The N reception antennas each process signals received from the air, and signals received through first to $N^{th}$ reception antenna ANT#1 and ANT#N are provided to a channel estimator 611 and a metric calculator 615. The channel estimator 611 performs channel estimation on signals output from the first to $N^{th}$ reception antennas ANT#1 to ANT#N, and then provides the channel estimation result to a hypothesis part 613.

A possible sequence generator 617 generates all kinds of sequences, which were possibly simultaneously encoded for information data bits in the transmitter, and provides the generated sequences to first to $P^{th}$ multiplexers 619-1 to 619-P. Because the transmitter transmits information data by the P information bits, the possible sequence generator 617 generates possible sequences $\tilde{d}_1 \ldots \tilde{d}_P$ comprised of P bits. The P bits of the generated possible sequences are applied to the first to $P^{th}$ multiplexers 619-1 to 619-P, and the first to $P^{th}$ multiplexers 619-1 to 619-P each multiplex bits received from the possible sequence generator 617, and then provide their outputs to first to $P^{th}$ encoders 621-1 to 621-P. The first to $P^{th}$ multiplexers 619-1 to 619-P perform a multiplexing operation for trellis termination as was described in conjunction with the multiplexer 511 illustrated in FIG. 5. The first to $P^{th}$ encoders 621-1 to 621-P encode signals received from the first to $P^{th}$ multiplexers 619-1 to 619-P in the STTC encoding scheme as was described in conjunction with FIG. 2, and then provide the encoded bits to first to $M^{th}$ modulators 623-1 to 623-M. The first to $M^{th}$ modulators 623-1 to 623-M each modulate the encoded bits output from the first to $P^{th}$ encoders 621-1 to 621-P in a predetermined modulation scheme, and provide their outputs to first to $M^{th}$ puncturers 625-1 to 625-M. The modulation scheme applied in the first to $M^{th}$ modulators 623-1 to 623-M is determined as any one of the BPSK, QPSK, QAM, PAM, and PSK modulation schemes. Because a modulation scheme applied in the first to $M^{th}$ modulators 517-1 to 517-M of FIG. 5 is $2^P$-ary QAM, the first to $M^{th}$ modulators 623-1 to 623-M also modulate their input signals in the $2^P$-ary QAM modulation scheme.

The first to $M^{th}$ puncturers 625-1 to 625-M puncture signals output from the first to $M^{th}$ modulators 623-1 to 623-M according to a puncturing matrix identical to the puncturing matrix applied in the first to $M^{th}$ puncturers 519-1 to 519-M illustrated in FIG. 5, and then provide their outputs to the hypothesis part 613. The hypothesis part 613 receives signals output from the first to $M^{th}$ puncturers 625-1 to 625-M and the channel estimation result output from the channel estimator 611, generates a hypothetic channel output at a time when a sequence consisting of the signals output from the first to $M^{th}$ puncturers 625-1 to 625-M passed the same channel as the channel estimation result did, and provides the generated hypothetic channel output to the metric calculator 615. The metric calculator 615 receives the hypothetic channel output provided from the hypothesis part 613 and the signals received through the first to $N^{th}$ reception antennas ANT#1 to ANT#N, and calculates a distance between the hypothetic channel output and the signals received through the first to $N^{th}$ reception antennas ANT#1 to ANT#N. The metric calculator 615 uses Euclidean distance when calculating the distance.

In this manner, the metric calculator 615 calculates Euclidean distance for all possible sequences the transmitter can transmit, and then provides the calculated Euclidean distance to a minimum distance selector 627. The minimum distance selector 627 selects a Euclidean distance having the minimum distance from Euclidean distances output from the metric calculator 615, determines information bits corresponding to the selected Euclidean distance as information bits transmitted by the transmitter, and provides the determined information bits to a parallel-to-serial (P/S) converter 629. Although there are several possible algorithms used when the minimum distance selector 627 determines information bits corresponding to the Euclidean distance having the minimum distance, it is assumed herein that a Viterbi algorithm is used.

Because the minimum distance selector 627 determines information bits corresponding to the Euclidean distance having the minimum distance for all sequences generated from the possible sequence generator 617, it finally outputs P information bits of $\hat{d}_1, \hat{d}_1, \ldots, \hat{d}_P$. The P/S converter 629 then serial-converts the P information bits output from the minimum distance selector 627, and outputs a reception information data sequence of $\hat{d}_1, \hat{d}_1, \ldots, \hat{d}_P$.

An operating principle of the present invention will now be described with reference to the transmitter structure and the receiver structure described in conjunction with FIGS. 5 and 6.

First, it will be assumed that the transmitter has 2 transmission antennas, the receiver has 1 reception antenna, and the transmitter uses BPSK as its modulation scheme. In the STTC, an increase in a constraint length K causes an increase in a minimum error length. If a transmission symbol matrix transmitted by the transmitter is defined as "C" and a reception symbol matrix incorrectly estimated by the receiver due to occurrence of an error is defined as "E," then an error matrix "B" is expressed in $$B = C - E \quad \text{Equation (2)}$$

In addition, if it is assumed that a matrix A is defined as $BB^H$ ($A = BB^H$) and channel characteristics that transmission antennas of the transmitter undergo are modeled with independent Gaussian, then a probability that the transmission symbol matrix C will be detected as an incorrectly estimated reception symbol matrix E is given by $$P(C \rightarrow E) \leq \left( \prod_{i=1}^{r} \lambda_i \right)^{-r} \left( \frac{E_s}{4N_0} \right)^{-r} \quad \text{Equation (3)}$$

In Equation (3), $\tau$ represents a rank of the matrix A, $\lambda_i$ represents an $i^{th}$ largest eigenvalue of the matrix A, $E_s$ represents energy of a received signal, and $N_o$ represents energy of a noise component. Here, a rank of the matrix A is identical to a rank of the error matrix B. It can be understood from Equation (3) that a rank $\tau$ of the matrix A functions as a chief cause of determining a symbol error rate. The rank $\tau$ of the matrix A becomes diversity gain and the $$\prod_{i=1}^{\tau} \lambda_i$$

becomes a coding gain. The error matrix B has as many rows as the number of transmission antennas of the transmitter, and a length of an error in the error matrix B represents the number of columns in the error matrix B.

When the transmitter uses BPSK as its modulation scheme as described above, a length of the shortest error is identical to the constraint length K. In addition, the fact that in the case of the STTC, a minimum rank of the error matrix B is identical to diversity gain is disclosed in Vahid Tarokh, N. Seshadri, and A. Calderbank, "Space Time Codes For High Data Rate Wireless Communication: Performance Criterion And Code Construction," IEEE Trans. on Info. Theory, pp. 744-765, Vol. 44, No. 2, March 1998, the contents of which are incorporated herein by reference. However, if signals transmitted from the transmitter are punctured as proposed in the invention, an element corresponding to the punctured period is replaced with "0" in the error matrix B, causing a reduction in a rank of the error matrix B.

It will be assumed herein that there is an error matrix $B_1$ given by $$B_1 = \begin{bmatrix} -1 & 0 & 0 & -1 \\ 0 & -1 & 0 & -1 \end{bmatrix} \quad \text{Equation (4)}$$

A puncturing matrix $P_P$ of Equation (5) below will be applied to the error matrix $B_1$ of Equation (4).

$$P_P = \begin{bmatrix} 1 & 1 & 1 & 1 \\ 1 & 0 & 1 & 0 \end{bmatrix} \quad \text{Equation (5)}$$

If the puncturing matrix $P_P$ of Equation (5) is applied to the error matrix $B_1$, an error matrix $B_2$ given by Equation (6) below is generated.

$$B_2 = \begin{bmatrix} -1 & 0 & 0 & -1 \\ 0 & 0 & 0 & 0 \end{bmatrix} \quad \text{Equation (6)}$$

It is noted from Equation (6) that a rank of the error matrix $B_2$ becomes 1. In the error matrix $B_2$, all elements in a second column are '0', so a rank of the error matrix $B_2$ becomes 1 and thus diversity gain becomes 1. That is, when the receiver uses one reception antenna as stated above, diversity gain becomes 1 (indicating that no transmission diversity technique is applied), and although the transmitter transmitted signals by applying the transmission diversity technique, the diversity gain suffers a loss due to the puncturing operation. The loss of the diversity gain undesirably deteriorates performance of a communication system using the STTC.

Therefore, the present invention proposes a puncturing matrix for maintaining diversity gain in performing puncturing to increase a data rate. A puncturing matrix proposed by the invention is equivalent to a puncturing matrix $P_1$ described in conjunction with FIG. 5 and Equation (1). If the puncturing matrix $P_1$ is applied to the error matrix $B_1$ of Equation (4), an error matrix $B_3$ given by Equation (7) below is generated.

$$B_3 = \begin{bmatrix} -1 & 0 & 0 & 0 \\ 0 & 0 & 0 & -1 \end{bmatrix} \quad \text{Equation (7)}$$

It is noted from Equation (7) that a rank of the error matrix $B_3$ becomes 2. In the error matrix $B_3$, there exists '1' in both first and second columns, so a rank of the error matrix $B_3$ becomes 2 and thus diversity gain becomes 2. That is, when the receiver uses one reception antenna as stated above, diversity gain becomes 2, which is identical to the case where the puncturing matrix is not applied, preventing a loss of the diversity gain due to the puncturing operation. In addition, it is possible to improve the entire system performance by increasing a data rate while maintaining the diversity gain.

A description will now be made of a characteristic of the puncturing matrix proposed by the invention. The puncturing matrix $P_1$ is created to periodically alternately locate a puncturing period, i.e., a puncturing symbol according to transmission antennas. That is, a symbol puncturing position exists in a second column of a second transmission antenna and a symbol puncturing position exists in a fourth column of a first transmission antenna, so that symbol puncturing positions are periodically alternately located according to the transmission antennas.

In most cases, when a transmitter includes two transmission antenna and a rank of an error matrix is decreased to 1, all elements in one row of the error matrix are changed to have a value of '0'. Therefore, when puncturing is applied to increase a data rate, it is necessary to prevent all elements in one row of the error matrix from being changed to '0'. In order to prevent all elements in one row of the error matrix from being changed to '0', i.e., in order to prevent a reduction in diversity gain, a possible small number of symbols must be punctured in each of rows of a transmission symbol matrix transmitted by the transmitter. In addition, rows of the transmission symbol matrix are acquired as many as possible so that though symbol puncturing is performed, there is at least one row in which no element has '0'. Here, increasing the number of columns of the transmission symbol matrix is equivalent to increasing an error length, and increasing the error length is equivalent to increasing a constraint length K. In addition, in order to puncture as small a number of symbols as possible in each of rows of the transmission symbol matrix, it is necessary to periodically puncture the same number of transmission symbols together with transmission symbols of each of remaining transmission antennas, rather than puncturing transmission symbols of only a particular transmission antenna. Further, because the error matrix is dependent on a generator polynomial as described in conjunction with FIG. 2, an appropriate generator polynomial must be detected in generating a puncturing matrix.

Herein, based on the assumption that a transmitter has 2 transmission antennas and a receiver has one reception antenna, the transmitter, when it uses BPSK as its modulation scheme, detects puncturing patterns of Table 1 below by considering all possible error matrixes and a generator polynomial.

TABLE 1

| Number | Puncturing Pattern (1: send, 0: puncture) | Rate | Min Error Length for Rank = 1 K = 4 | K = 5 |
|---|---|---|---|---|
| 1 | 1 1 1 0 1 1 1 0 1 1 1 0 1 1 1 0 1 0 1 1 1 0 1 1 1 0 1 1 1 0 1 1 | 4/3 | 13 | 16 |
| 2 | 1 1 1 1 1 1 1 1 1 1 1 1 1 1 1 1 1 0 1 0 1 0 1 0 1 0 1 0 1 0 1 0 | 4/3 | 7 | 10 |
| 3 | 1 1 1 1 1 1 1 1 1 1 1 1 1 1 1 1 1 0 1 1 1 0 1 1 1 0 1 1 1 0 1 1 | 8/7 | 13 | 16 |

Shown in Table 1 are puncturing patterns having a minimum error length for rank=1. In Table 1, a puncturing pattern #1 is a pattern for periodically alternately puncturing symbols output from the two transmission antennas, a puncturing pattern #2 is a pattern for periodically puncturing only symbols output form a particular transmission antenna among symbols output from the two transmission antennas, i.e., puncturing every other symbol, and a puncturing pattern #3 is a pattern for periodically puncturing symbols output from a particular transmission antenna among symbols output from the two transmission antennas, i.e., puncturing every three symbols. It is noted from Table 1 that for the puncturing pattern #1 for periodically alternately puncturing symbols output from the two transmission antennas, a minimum error length for rank=1 is increased to 13 or 16. The increase in minimum error length further separates positions where elements of '0' in an error matrix exist, decreasing the number of cases where the rank is decreased. Particularly, when a frame, or a unit transmission time of the transmission antennas, is comprised of 13 or 16 symbols, if the puncturing pattern #1 is applied, it is possible to prevent a rank from being decreased.

In addition, when the constraint length K is 4 (constraint length K=4) and a puncturing pattern is identical to the puncturing pattern #1 of Table 1, optimal generator polynomials are as follows. Here, the term "optimal generator polynomial" refers to a generator polynomial for which the minimum number is 13 among the numbers of columns of an error matrix incurring a loss of diversity gain.

Optimal Generator Polynomials (constraint length K=4)

131 $g1=1+D+D^3$, $g2=1+D^3$

133 $g1=1+D^2+D^3$, $g2=1+D^3$

159 $g1=1+D^3$, $g2=1+D+D^3$

189 $g1=1+D^3$, $g2=1+D^2+D^3$

Even when a puncturing pattern applied to the cases of 159 and 189 in the optimal generator polynomials is the puncturing pattern #3 of Table 1, the minimum number of columns of an error matrix incurring a loss of diversity gain maintains 13.

In addition, when the constraint length K is 4 (constraint length K=5) and a puncturing pattern is identical to the puncturing pattern #1 of Table 1, optimal generator polynomials are as follows. Here, the term "optimal generator polynomial" refers to a generator polynomial for which the minimum number is 16 among the numbers of columns of an error matrix incurring a loss of diversity gain.

Optimal Generator Polynomials (constraint length K=5)

581 $g1=1+D+D^2+D^4$, $g2=1+D+D^4$

587 $g1=1+D^2+D^3+D^4$, $g2=1+D+D^4$

589 $g1=1+D+D^2+D^3+D4$, $g2=1+D+D^4$

701 $g1=1+D+D^4$, $g2=1+D+D^2+D^4$

707 $g1=1+D^3+D^4$, $g2=1+D+D^2+D^4$

713 $g1=1+D+D^2+D^3+D^4$, $g2=1+D+D^2+D^4$

767 $g2=1+D+D^2+D^4$, $g2=1+D^3+D^4$

773 $g1=1+D^2+D^3+D^4$, $g2=1+D^3+D^4$

757 $g1=1+D+D^2+D^3+D^4$, $g2=1+D^3+D^4$

887 $g1=1+D+D^4$, $g2=1+D^2+D^3+D^4$

893 $g1=1+D^3+D^4$, $g2=1+D^2+D^3+D^4$

899 $g1=1+D+D^2+D^3+D^4$ $g2=1+D^2+D^3+D^4$

949 $g1=1+D+D^4$, $g2=1+D+D^2+D^3+D^4$

953 $g1=1+D+D^2+D^4$, $g2=1+D+D^2+D^3+D^4$

955 $g1=1+D^3+D^4$, $g2=1+D+D^2+D^3+D^4$

959 $g1=1+D^2+D^3+D^4$, $g2=1+D+D^2+D^3+D^4$

Figure 7:
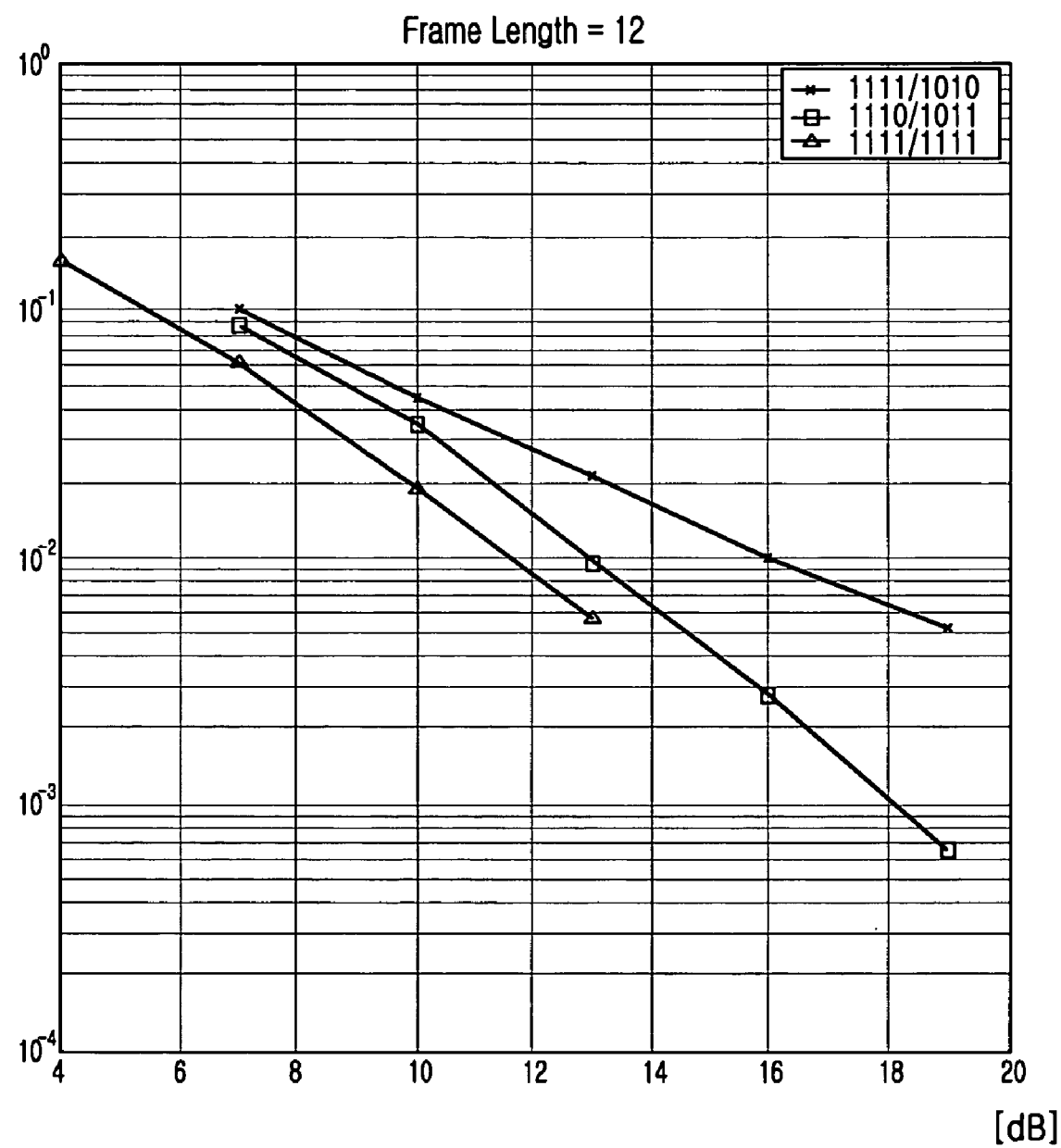
FIG. 7 is a graph schematically illustrating a simulation result of the present invention for a constraint length K=4.

FIG. 7 is a graph schematically illustrating a simulation result of the present invention for a constraint length K=4. It is assumed in FIG. 7 that the number of transmission antennas of a transmitter is 2, a constraint length K applied in STTC encoding is 4 (K=4), BPSK is applied as a modulation scheme, and the number of reception antennas of a receiver is 1. In addition, it is assumed that signals transmitted from the two transmission antennas suffer independent rayleigh fading channels, channel estimation performance is 100%, an optimal generator polynomial of g 133, i.e., $g1=1+D^2+D^3$, $g2=1+D^3$, is used, and one frame is comprised of 12 symbols.

In FIG. 7, a frame error rate (FER) of BPSK STTC is shown for which a constraint length is 4, i.e., the number of states is 8. It is noted that a case where the puncturing is applied to both of the two transmission antennas (indicated by "1110/1011" in FIG. 7) shows performance deterioration of about 1 dB at both a point where a frame error rate is 0.1 and a point where a frame error rate is 0.01, compared with a case where the puncturing is applied to none of the two transmission antennas (indicated by "1111/1111" in FIG. 7). This indicates that the transmitter must increase transmission power by about 1 dB in order to maintain the same frame error rate even when the puncturing is applied. That is, the transmitter suffers a loss of about 1 dB in terms of coding gain by performing puncturing as compared with when the puncturing is not performed. However, a case where puncturing is applied to both of the two transmission antennas is identical in a slope of frame error rates to a case where the puncturing is applied to none of the two transmission antennas, and this indicates that diversity gain is maintained even though the puncturing is applied.

Unlike the case where puncturing is applied to both of the two transmission antennas, a case where the puncturing is applied to symbols output from only one transmission antenna (indicated by "1111/1010" in FIG. 7) shows performance deterioration of about 1 dB at a point where a frame error rate is 0.1 and shows performance deterioration of about 3 dB at a point where a frame error rate is 0.01, compared with a case where the puncturing is not applied. In conclusion, a slope of the frame error rate for the case where the puncturing is applied to symbols output from only one of the two transmission antennas is lower than a slope of a frame error rate for the case where the puncturing is not applied, and this indicates a loss of diversity gain.

Figure 8:
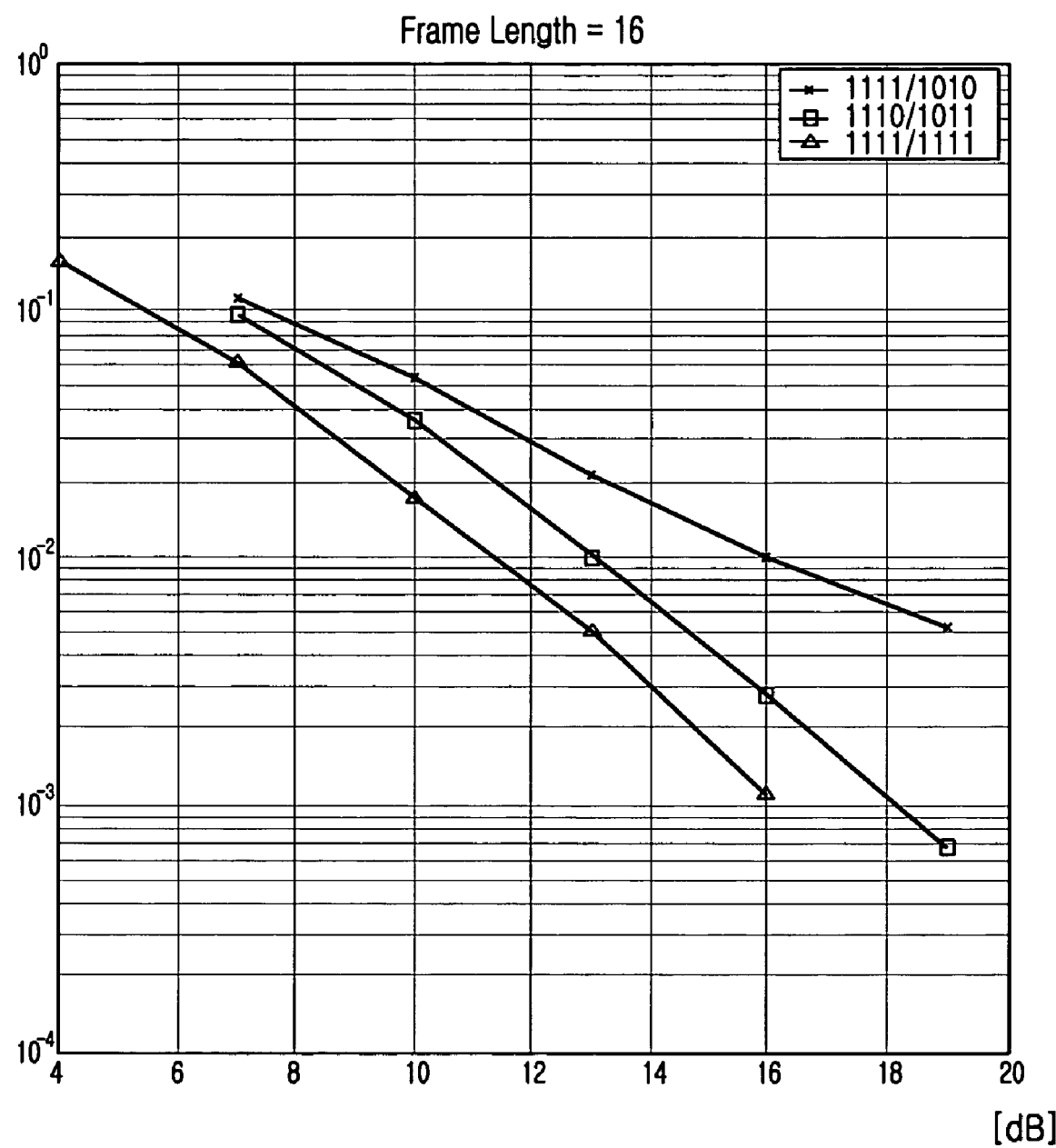
FIG. 8 is a graph schematically illustrating a simulation result of the present invention for a constraint length K=5.

FIG. 8 is a graph schematically illustrating a simulation result of the present invention for a constraint length K=5. It is assumed in FIG. 8 that the number of transmission antennas of a transmitter is 2, a constraint length K applied for STTC encoding is 5 (K=5), BPSK is applied as a modulation scheme, and the number of reception antennas of a receiver is 1. In addition, it is assumed that signals transmitted from the two transmission antennas suffer independent rayleigh fading channels, channel estimation performance is 100%, an optimal generator polynomial of g 953, i.e., $g1=1+D+D^2+D^4$, $g2=1+D+D^2+D^3+D^4$, is used, and one frame is comprised of 12 symbols.

In FIG. 8, a frame error rate of BPSK STTC for which a constraint length is 5 is shown, i.e., the number of states is 16. It is noted that a case where the puncturing is applied to both of the two transmission antennas (indicated by "1110/1011" in FIG. 8) shows performance deterioration of about 1 dB at both a point where a frame error rate is 0.1 and a point where a frame error rate is 0.01, compared with a case where the puncturing is applied to none of the two transmission antennas (indicated by "1111/1111" in FIG. 8). This indicates that the transmitter must increase transmission power by about 1 dB in order to maintain the same frame error rate even when the puncturing is applied. That is, the transmitter suffers a loss of about 1 dB in terms of coding gain by performing puncturing as compared with when the puncturing is not performed. However, a case where puncturing is applied to both of the two transmission antennas is identical in a slope of frame error rates to a case where the puncturing is applied to none of the two transmission antennas, and this indicates that diversity gain is maintained even though the puncturing is applied.

Unlike the case where puncturing is applied to both of the two transmission antennas, a case where the puncturing is applied to symbols output from only one transmission antenna (indicated by "1111/1010" in FIG. 8) shows performance deterioration of about 1.5 dB at a point where a frame error rate is 0.1 and shows performance deterioration of about 5 dB at a point where a frame error rate is 0.01, compared with a case where the puncturing is not applied. In conclusion, a slope of the frame error rate for the case where the puncturing is applied to symbols output from only one of the two transmission antennas is lower than a slope of a frame error rate for the case where the puncturing is not applied, and this indicates a loss of diversity gain.

A trellis termination operation by the multiplexer 511 according to the present invention will now be described.

Generally, "trellis termination" refers to an operation of inserting null data, i.e., '0', in a predetermined number of bits, e.g., K bits, at the last part of a corresponding transmission frame on a frame-by-frame basis, before transmission. A transmitter indicates through trellis termination that transmission of a corresponding transmission frame is terminated, and a receiver then can detect termination of a reception frame. A general transmission frame format based on trellis termination will now be described with reference to FIG. 9.

Figure 9:
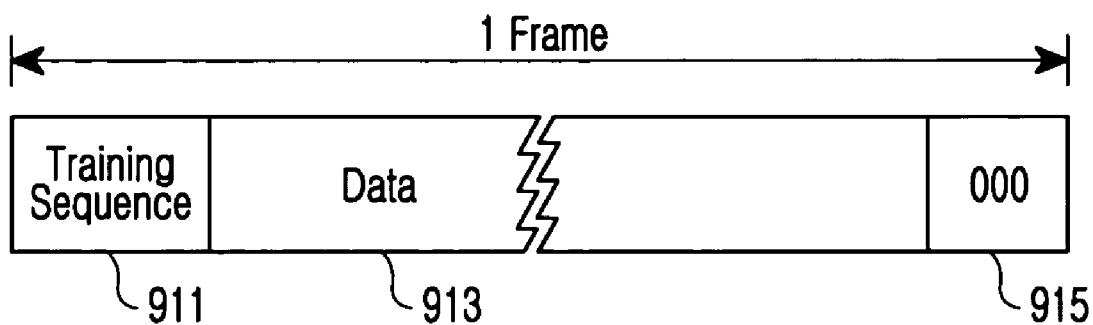
FIG. 9 schematically illustrates a general transmission frame format based on trellis termination.

Referring to FIG. 9, the transmission frame format is comprised of a training sequence transmission period (Training_Sequence) 911, an information data transmission period (Data) 913, and a trellis termination period 915. The training sequence transmission period 911 is a time period in which a training sequence for initial channel estimation between the transmitter and a receiver is transmitted. The information data transmission period 913 is a time period in which actual information data is transmitted, and the trellis termination period 915 is a time period for which a predetermined number of null data bits, for example, K null data bits, for trellis termination are transmitted.

In a transmitter using STTC, when a constraint length k is 4 and an error matrix B described in conjunction with Equation (4), Equation (6), and Equation (7) is applied, diversity gain is maintained until a length of the error matrix B is 12. However, when the length of the error matrix B exceeds 12, the diversity gain suffers a loss. That is, assuming that trellis termination is performed by the transmission frame, if a length of the transmission frame exceeds 12, diversity gain suffers a loss, and as a result, the loss acts as a chief cause of increasing a frame error rate of punctured STTC. As a result, the increase in a frame error rate limits a length of transmission frames the transmitter using STTC can transmit.

However, in the present invention, the multiplexer 511 described in conjunction with FIG. 5 controls an insertion position of null data for trellis termination. That is, the invention inserts null data for trellis termination during transmission of information data, rather than inserting the entire null data for trellis termination in the last position of a transmission frame. This will be described in more detail with reference to FIG. 10.

Figure 10:
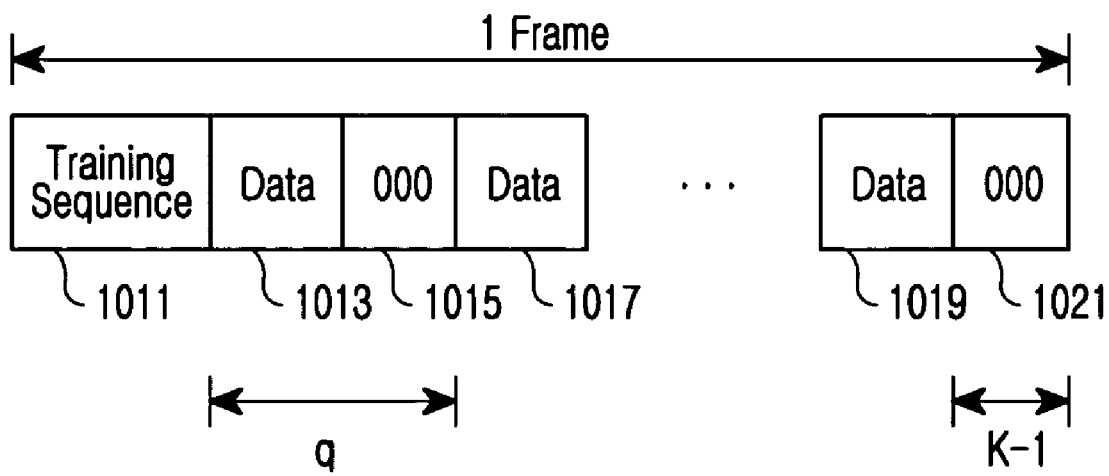
FIG. 10 schematically illustrates a transmission frame format based on trellis termination according to an embodiment of the present invention.

FIG. 10 schematically illustrates a transmission frame format based on trellis termination according to an embodiment of the present invention. Referring to FIG. 10, the transmission frame format is comprised of a training sequence transmission period (Training_Sequence) 1011, information data transmission periods (Data) 1013, 1017, and 1019, and trellis termination periods 1015 and 1021. The training sequence transmission period 1011 is a time period in which a training sequence for initial channel estimation between the transmitter and a receiver is transmitted. The information data transmission periods 1013, 1017, and 1019 are time periods in which actual information data is transmitted, and the trellis termination periods 1015 and 1021 are time periods in which null data for trellis termination is transmitted. As illustrated in FIG. 10, the present invention inserts null data for trellis termination in between transmissions of information data, rather than inserting the entire null data for trellis termination in the last part of a transmission frame. If it is assumed that a constraint length k is "K" and the number of columns at a time when a rank of the error matrix B starts suffering a loss, i.e., a time when diversity gain starts suffering a loss due to a characteristic of the STTC, is q, the multiplexer 511 controls multiplexing in a method of repeating an operation of transmitting (q−K) information data bits and then transmitting (K−1) null data bits. As a result, the multiplexer 511 performs multiplexing in a method of repeating an operation of transmitting (K−1) null data bits after transmitting (q−K) information data bits in accordance with the transmission frame format illustrated in FIG. 10.

For example, it is assumed that a code rate after the puncturing proposed by the invention is R, and a length of a transmission frame from which the training sequence is excluded is L. When general trellis termination is applied, a code rate after puncturing is R times higher than a code rate for a case where the puncturing is not performed. However, when the trellis termination proposed by the present invention is applied, (K−1) null data bits are transmitted after (q−K) information data bits are transmitted. As a result, the invention transmits $$\frac{L}{(q-1)*(K-1)}$$

fewer symbols as compared with when the general trellis termination is applied, so that a code rate becomes $$\frac{R-(K-1)}{(q-1)}.$$

Of course, although a code rate suffers a loss, when the proposed trellis termination is applied, it is possible to maintain diversity gain regardless of a length L of a transmission frame transmitted by a transmitter. This contributes to performance improvement, especially for a high signal-to-noise ratio (SNR). In addition, even though the number of columns of an error matrix B, which starts losing a rank becomes q, it is possible to prevent a loss of a code rate by increasing a period of the trellis termination to a value higher than (q−1).

As described above, in a mobile communication system using STTC, the present invention increases a data rate by periodically puncturing information data symbols transmitted according to transmission antennas. The mobile communication system using STTC increases system performance by maintaining diversity gain while increasing a data rate through puncturing. In addition, the mobile communication system using STTC can maintain diversity gain regardless of a length of a transmission frame, by periodically performing trellis termination during transmission of information data.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A data transmission apparatus having maximum diversity gain in a mobile communication system including M transmission antennas, comprising:
   P encoders for receiving P information bit streams and encoding the received P information bit streams with a space-time trellis code (STTC) according to an optimal generator polynomial;
   M modulators for modulating P information bit streams output from the P encoders in a predetermined modulation scheme and outputting modulation symbol streams; and
   M puncturers connected to the M transmission antennas, for puncturing at least one modulation symbol in a predetermined position from each of the modulation symbol streams output form the M modulators, and transmitting the punctured modulation symbol streams through the M transmission antennas.

2. The data transmission apparatus of claim 1, wherein for the modulation symbol streams output form the M modulators, the M puncturers each set a number of the at least one punctured modulation symbol to a same number.

3. The data transmission apparatus of claim 1, wherein the M puncturers each set the modulation symbol streams output from the M modulators so that a position where the at least one modulation symbol is punctured is periodically repeated.

4. The data transmission apparatus of claim 1, wherein if the M is 2 and a number of modulation symbols constituting the modulation symbol stream is 4, the position where the at least one modulation symbol is punctured is determined according to a puncturing matrix $P_1$ given by $$P_1 = \begin{bmatrix} 1 & 1 & 1 & 0 \\ 1 & 0 & 1 & 1 \end{bmatrix}$$

where a column corresponds to a transmission period, a row corresponds to a transmission antenna, and the at least one modulation symbol is punctured in a position of an element '0'.

5. The data transmission apparatus of claim 1, wherein if the M is 2 and the predetermined modulation scheme is binary phase shift keying (BPSK), the position where the at least one modulation symbol is punctured is determined according to a puncturing matrix $P_1$ given by $$P_1 = \begin{bmatrix} 1 & 1 & 1 & 0 & 1 & 1 & 1 & 0 & 1 & 1 & 1 & 0 & 1 & 1 & 1 & 0 \\ 1 & 0 & 1 & 1 & 1 & 0 & 1 & 1 & 1 & 0 & 1 & 1 & 1 & 0 & 1 & 1 \end{bmatrix}$$

where a column corresponds to a transmission period, a row corresponds to a transmission antenna, and the at least one modulation symbol is punctured in a position of an element '0'.

6. The data transmission apparatus of claim 1, wherein the optimal generator polynomial is a generator polynomial for enabling modulation symbol streams transmitted through the M transmission antennas to maintain the maximum diversity gain, and if a constraint length of the STTC is 4, the P encoders each use any one of the following generator polynomials as the optimal generator polynomial:

$g1=1+D+D^3$, $g2=1+D^3$ $g1=1+D^2+D^3$, $g2=1+D^3$ $g1=1+D^3$, $g2=1+D+D^3$ $g1=1+D^3$, $g2=1+D^2+D^3$.

7. The data transmission apparatus of claim 1, wherein the optimal generator polynomial is a generator polynomial for enabling modulation symbol streams transmitted through the M transmission antennas to maintain the maximum diversity gain, and if a constraint length of the STTC is 5, the P encoders each use any one of the following generator polynomials as the optimal generator polynomial:

$g1=1+D+D^2+D^4$, $g2=1+D+D^4$ $g1=1+D^2+D^3+D^4$ $g2=1+D+D^4$ $g1=1+D+D^2+D^3+D^4$, $g2=1+D+D^4$ $g1=1+D+D^4$, $g2=1+D+D^2+D^4$ $g1=1+D^3+D^4$, $g2=1+D+D^2+D^4$ $g1=1+D+D^2+D^3+D^4$, $g2=1+D+D^2+D^4$ $g2=1+D+D^2+D^4$, $g2=1+D^3+D^4$ $g1=1+D^2+D^3+D^4$, $g2=1+D^3+D^4$ $g1=1+D+D^2+D^3+D^4$ $g2=1+D^3+D^4$ $g1=1+D+D^4$, $g2=1+D^2+D^3+D^4$ $g1=1+D^3+D^4$, $g2=1+D^2+D^3+D^4$ $g1=1+D+D^2+D^3+D^4$, $g2=1+D^2+D^3+D^4$ $g1=1+D+D^4$, $g2=1+D+D^2+D^3+D^4$ $g1=1+D+D^2+D^4$, $g2=1+D+D^2+D^3+D^4$ $g1=1+D^3+D^4$, $g2=1+D+D^2+D^3+D^4$ $g1=1+D^2+D^3+D^4$ $g2=1+D+D^2+D^3+D^4$.

8. The data transmission apparatus of claim 1, further comprising a multiplexer for multiplexing the information bit streams and null data streams for trellis termination.

9. The data transmission apparatus of claim 8, wherein the multiplexer repeatedly outputs (K−1) null data streams after outputting (q−K) information bit streams for one frame, where K indicates a constraint length of the STTC and q indicates a number of columns of an error matrix incurring a loss of a diversity rank of the STTC.

10. A data transmission method having maximum diversity gain in a mobile communication system including M transmission antennas, comprising the steps of:
receiving P information bit streams and encoding the received P information bit streams with a space-time trellis code (STTC) according to an optimal generator polynomial;
modulating the encoded P information bit streams in a predetermined modulation scheme and outputting M modulation symbol streams; and
puncturing at least one modulation symbol in a predetermined position from each of the M modulation symbol streams, and transmitting the punctured modulation symbol streams through M transmission antennas.

11. The data transmission method of claim 10, wherein for the M modulation symbol streams, a number of the at least one punctured modulation symbol is set to a same number.

12. The data transmission method of claim 10, wherein the M modulation symbol streams are set so that a position where the modulation symbol is punctured is periodically repeated.

13. The data transmission method of claim 10, wherein if the M is 2 and a number of modulation symbols constituting the modulation symbol stream is 4, the position where the modulation symbol is punctured is determined according to a puncturing matrix $P_1$ given by $$P_1 = \begin{bmatrix} 1 & 1 & 1 & 0 \\ 1 & 0 & 1 & 1 \end{bmatrix}$$

where a column corresponds to a transmission period, a row corresponds to a transmission antenna, and the at least one modulation symbol is punctured in a position of an element '0'.

14. The data transmission method of claim 10, wherein if the M is 2 and the predetermined modulation scheme is binary phase shift keying (BPSK), the position where the modulation symbol is punctured is determined according to a puncturing matrix $P_1$ given by $$P_1 = \begin{bmatrix} 1 & 1 & 1 & 0 & 1 & 1 & 1 & 0 & 1 & 1 & 1 & 0 & 1 & 1 & 1 & 0 \\ 1 & 0 & 1 & 1 & 1 & 0 & 1 & 1 & 1 & 0 & 1 & 1 & 1 & 0 & 1 & 1 \end{bmatrix}$$

where a column corresponds to a transmission period, a row corresponds to a transmission antenna, and the at least one modulation symbol is punctured in a position of an element '0'.

15. The data transmission method of claim 10, wherein the optimal generator polynomial is a generator polynomial for enabling modulation symbol streams transmitted through the M transmission antennas to maintain the maximum diversity gain, and if a constraint length of the STTC is 4, any one of the following generator polynomials is used as the optimal generator polynomial:

$g1=1+D+D^3, g2=1+D^3$ $g1=1+D^2+D^3, g2=1+D^3$ $g1=1+D^3, g2=1+D+D^3$ $g1=1+D^3, g2=1+D^2+D^3$.

16. The data transmission method of claim 10, wherein the optimal generator polynomial is a generator polynomial for enabling modulation symbol streams transmitted through the M transmission antennas to maintain the maximum diversity gain, and if a constraint length of the STTC is 5, any one of the following generator polynomials is used as the optimal generator polynomial:

$g1=1+D+D^2+D^4, g2=1+D+D^4$ $g1=1+D^2+D^3+D^4, g2=1+D+D^4$ $g1=1+D+D^2+D^3+D^4, g2=1+D+D^4$ $g1=1+D+D^4, g2=1+D+D^2+D^4$ $g1=1+D^3+D^4, g2=1+D+D^2+D^4$ $g1=1+D+D^2+D^3+D^4, g2=1+D+D^2+D^4$ $g2=1+D+D^2+D^4, g2=1+D^3+D^4$ $g1=1+D^2+D^3+D^4 \; g2=1+D^3+D^4$ $g1=1+D+D^2+D^3+D^4, g2=1+D^3+D^4$ $g1=1+D+D^4, g2=1+D^2+D^3+D^4$ $g1=1+D^3+D^4, g2=1+D^2+D^3+D^4$ $g1=1+D+D^2+D^3+D^4, g2=1+D^2+D^3+D^4$ $g1=1+D+D^4, g2=1+D+D^2+D^3+D^4$ $g1=1+D+D^2+D^4, g2=1+D+D^2+D^3+D^4$ $g1=1+D^3+D^4, g2=1+D+D^2+D^3+D^4$ $g1=1+D^2+D^3+D^4, g2=1+D+D^2+D^3+D^4$.

17. The data transmission method of claim 10, further comprising the step of multiplexing the information bit streams and null data streams for trellis termination.

18. The data transmission method of claim 17, wherein the multiplexing step comprises the step of repeatedly outputting (K−1) null data streams after outputting (q−K) information bit streams for one frame, where K indicates a constraint length of the STTC and q indicates the number of columns of an error matrix incurring a loss of a diversity rank of the STTC.

19. A data reception apparatus having maximum diversity gain in a mobile communication system, which receives through M reception antennas transmission symbol streams transmitted through N transmission antennas from a transmitter, the apparatus comprising:

a channel estimator connected to the M reception antennas, for channel-estimating reception symbol streams output from the M reception antennas;

P encoders for encoding all information bit streams that the transmitter can transmit with a space-time trellis code (STTC) according to a predetermined optimal generator polynomial;

M modulator for modulating information bit streams output from the P encoders in a predetermined modulation scheme and outputting modulation symbol streams;

M puncturers connected to the M transmission antennas, for puncturing at least one modulation symbol in a predetermined position from each of the modulation symbol streams output from the M modulators; and a transmission symbol stream detector for detecting transmission symbol streams transmitted from the transmitter by using a hypothetic channel output when the modulation symbol streams output from the M puncturers are transmitted through a same channel as a channel estimated by the channel estimator, and the reception symbol streams.

20. The data reception apparatus of claim 19, wherein for the modulation symbol streams output from the M modulators, the M puncturers each set a number of the at least one punctured modulation symbols to a same number.

21. The data reception apparatus of claim 19, wherein the M puncturers each set the modulation symbol streams output form the M modulators so that the position where the at least one modulation symbol is punctured is periodically repeated.

22. The data reception apparatus of claim 19, wherein if the M is 2 and a number of modulation symbols constituting the modulation symbol stream is 4, the position where the at least one modulation symbol is punctured is determined according to a puncturing matrix $P_1$ given by $$P_1 = \begin{bmatrix} 1 & 1 & 1 & 0 \\ 1 & 0 & 1 & 1 \end{bmatrix}$$

where a column corresponds to a transmission period, a row corresponds to a transmission antenna, and the at least one modulation symbol is punctured in a position of an element '0'.

23. The data reception apparatus of claim 19, wherein if the M is 2 and the predetermined modulation scheme is binary phase shift keying (BPSK), the position where the at least one modulation symbol is punctured is determined according to a puncturing matrix $P_1$ given by $$P_1 = \begin{bmatrix} 1 & 1 & 1 & 0 & 1 & 1 & 1 & 0 & 1 & 1 & 1 & 0 & 1 & 1 & 1 & 0 \\ 1 & 0 & 1 & 1 & 1 & 0 & 1 & 1 & 1 & 0 & 1 & 1 & 1 & 0 & 1 & 1 \end{bmatrix}$$

where a column corresponds to a transmission period, a row corresponds to a transmission antenna, and the at least one modulation symbol is punctured in a position of an element '0'.

24. The data reception apparatus of claim 19, wherein the optimal generator polynomial is a generator polynomial for enabling the modulation symbol streams to maintain the maximum diversity gain, and if a constraint length of the STTC is 4, the P encoders each use any one of the following generator polynomials as the optimal generator polynomial:

$g1=1+D+D^3$, $g2=1+D^3$ $g1=1+D^2+D^3$, $g2=1+D^3$ $g1=1+D^3$, $g2=1+D+D^3$ $g1=1+D^3$, $g2=1+D^2+D^3$.

25. The data reception apparatus of claim 19, wherein the optimal generator polynomial is a generator polynomial for enabling the modulation symbol streams to maintain the maximum diversity gain, and if a constraint length of the STTC is 5, the P encoders each use any one of the following generator polynomials as the optimal generator polynomial:

$g1=1+D+D^2+D^4$, $g2=1+D+D^4$ $g1=1+D^2+D^3+D^4$, $g2=1+D+D^4$ $g1=1+D+D^2+D^3+D^4$, $g2=1+D+D^4$ $g1=1+D+D4$, $g2=1+D+D^2+D^4$ $g1=1+D^3+D^4$, $g2=1+D+D^2+D^4$ $g1=1+D+D^2+D^3+D^4$, $g2=1+D+D^2+D^4$ $g2=1+D+D^2+D^4$, $g2=1+D^3+D^4$ $g1=1+D^2+D^3+D^4$, $g2=1+D^3+D^4$ $g1=1+D+D2+D^3+D^4$, $g2=1+D^3+D^4$ $g1=1+D+D^4$, $g2=1+D^2+D^3+D^4$ $g1=1+D^3+D^4$, $g2=1+D^2+D^3+D^4$ $g1=1+D+D^2+D^3+D^4$ $g2=1+D^2+D^3+D_4$ $g1=1+D+D^4$, $g2=1+D+D^2+D^3+D^4$ $g1=1+D+D^2+D^4$, $g2=1+D+D^2+D^3+D^4$ $g1=1+D^3+D^4$, $g2=1+D+D^2+D^3+D^4$ $g1=1+D^2+D^3$ $D^4$, $g2=1+D+D^2+D^3+D^4$.

26. The data reception apparatus of claim 19, wherein transmission symbol stream detector comprises:
a hypothesis part for generating a hypothetic channel output when the modulation symbol streams output form the M puncturers were transmitted through a same channel as a channel estimated by the channel estimator;
a metric calculator for calculating a distance between the hypothetic channel output and the reception symbol streams; and
a minimum distance selector for detecting a reception symbol stream having a minimum distance among distances between the hypothetic channel output and the reception symbol streams as a transmission symbol stream transmitted from the transmitter.

27. The data reception apparatus of claim 19, further comprising a multiplexer for multiplexing the information bit streams and null data streams for trellis termination.

28. The data reception apparatus of claim 27, wherein the multiplexer repeatedly outputs (K−1) null data streams after outputting (q−K) information bit streams for one frame, where K indicates a constraint length of the STTC and q indicates the number of columns of an error matrix incurring a loss of a diversity rank of the STTC.

29. A data reception method having maximum diversity gain in a mobile communication system, which receives through M reception antennas transmission symbol streams transmitted through N transmission antennas from a transmitter, the method comprising the steps of:
channel-estimating reception symbol streams output from the M reception antennas;
encoding all information bit streams that the transmitter can transmit with a space-time trellis code (STTC) according to a predetermined optimal generator polynomial;
modulating the encoded information bit streams in a predetermined modulation scheme and outputting modulation symbol streams;
puncturing at least one modulation symbol in a predetermined position from each of the modulation symbol streams; and
detecting transmission symbol streams transmitted from the transmitter by using a hypothetic channel output when the punctured modulation symbol streams were transmitted through a same channel as the channel-estimated channel, and the reception symbol streams.

30. The data reception method of claim 29, wherein for the modulation symbol streams, a number of the at least one punctured modulation symbols is set to a same number.

31. The data reception method of claim 29, wherein the modulation symbol streams are set so that the position where the at least one modulation symbol is punctured is periodically repeated.

32. The data reception method of claim 29, wherein if the M is 2 and a number of modulation symbols constituting the modulation symbol stream is 4, the position where the at least one modulation symbol is punctured is determined according to a puncturing matrix $P_1$ given by $$P_1 = \begin{bmatrix} 1 & 1 & 1 & 0 \\ 1 & 0 & 1 & 1 \end{bmatrix}$$

where a column corresponds to a transmission period, a row corresponds to a transmission antenna, and the at least one modulation symbol is punctured in a position of an element '0'.

33. The data reception method of claim 29, wherein if the M is 2 and the predetermined modulation scheme is binary phase shift keying (BPSK), the position where the at least one modulation symbol is punctured is determined according to a puncturing matrix $P_1$ given by $$P_1 = \begin{bmatrix} 1 & 1 & 1 & 0 & 1 & 1 & 1 & 0 & 1 & 1 & 1 & 0 & 1 & 1 & 1 & 0 \\ 1 & 0 & 1 & 1 & 1 & 0 & 1 & 1 & 1 & 0 & 1 & 1 & 1 & 0 & 1 & 1 \end{bmatrix}$$

where a column corresponds to a transmission period, a row corresponds to a transmission antenna, and the at least one modulation symbol is punctured in a position of an element '0'.

34. The data reception method of claim 29, wherein the optimal generator polynomial is a generator polynomial for enabling the modulation symbol streams to maintain the maximum diversity gain, and if a constraint length of the STTC is 4, any one of the following generator polynomials is used as the optimal generator polynomial:

$g1=1+D+D^3, g2=1+D^3$ $g1=1+D^2+D^3, g2=1+D^3$ $g1=1+D^3, g2=1+D+D^3$ $g1=1+D^3, g2=1+D^2+D^3$.

35. The data reception method of claim 29, wherein the optimal generator polynomial is a generator polynomial for enabling the modulation symbol streams to maintain the maximum diversity gain, and if a constraint length of the STTC is 5, any one of the following generator polynomials is used as the optimal generator polynomial:

$g1=1+D+D^2+D^4, g2=1+D+D^4$ $g1=1+D^2+D^3+D^4, g2=1+D+D^4$ $g1=1+D+D^2+D^3+D^4, g2=1+D+D^4$ $g1=1+D+D^4, g2=1+D+D^2+D^4$ $g1=1+D^3+D^4, g2=1+D+D^2+D^4$ $g1=1+D+D^2+D^3+D^4, g2=1+D+D^2+D^4$ $g2=1+D+D^2+D^4, g2=1+D^3+D^4$ $g1=1+D^2+D^3+D^4\ g2=1+D^3+D^4$ $g1=1+D+D^2+D^3+D^4, g2=1+D^3+D^4$ $g1=1+D+D^4, g2=1+D^2+D^3+D^4$ $g1=1+D^3+D^4, g2=1+D^2+D^3+D^4$ $g1=1+D+D^2+D^3+D^4, g2=1+D^2+D^3+D^4$ $g1=1+D+D^4, g2=1+D+D^2+D^3+D^4$ $g1=1+D+D^2+D^4, g2=1+D+D^2+D^3+D^4$ $g1=1+D^3+D^4, g2=1+D+D^2+D^3+D^4$ $g1=1+D^2+D^3+D^4, g2=1+D+D^2+D^3+D^4$.

36. The data reception method of claim 29, further comprising the step of multiplexing the information bit streams and null data streams for trellis termination.

37. The data reception method of claim 36, wherein the multiplexing step comprises the step of repeatedly outputting (K−1) null data streams after outputting (q−K) information bit streams for one frame, where K indicates a constraint length of the STTC and q indicates the number of columns of an error matrix incurring a loss of a diversity rank of the STTC.

* * * * *